United States Patent Office 3,845,138
Patented Oct. 29, 1974

3,845,138
PROCESS FOR THE REDUCTION OF TEREPH-
THALALDEHYDE TO p-HYDROXYMETHYL-
BENZALDEHYDE
Andrew P. Dunlop, Riverside, and Edward Sherman and Joseph P. Wuskell, Barrington, Ill., assignors to The Quaker Oats Company, Chicago, Ill.
No Drawing. Filed Oct. 6, 1972, Ser. No. 295,549
Int. Cl. C07c 45/00
U.S. Cl. 260—600                                    9 Claims

ABSTRACT OF THE DISCLOSURE

The present invention relates to a process for the catalytic reduction of terephthalaldehyde to p-hydroxymethylbenzaldehyde. A number of catalysts selected from metals of the eighth periodic group are known to reduce the aldehyde function of terephthalaldehyde to yield some of the desired p-hydroxymetyhlbenzaldehyde. However, only by judicious use of a specified amount of base can the catalytic reduction be maximized to afford p-hydroxymethylbenzaldehyde in yields greater than 90 percent by weight.

BACKGROUND OF THE INVENTION

Field of the Invention

This invention relates to a process for producing one of the aldehyde functions in terephthalaldehyde to the corresponding alcohol.

Description of the Prior Art p-Hydroxymethylbenzaldehyde is a valuable aromatic compound which has been described in the literature and can be prepared by a number of synthetic techniques. It is not presently an article of commerce because of the high cost of present methods of preparation. This compound is useful as a chemical intermediate in the production of dyes and insecticides.

The material can be prepared by a variety of classical synthetic techniques. One of the oldest methods described in Beilstein, vol. VIII, Sys. No. 748, p. 102 (1918) consists of the hydrolysis of alpha, alpha, alpha'-tribromo-p-xylene. Another method is the controlled oxidation of alpha, alpha'-dichloro-p-xylene with nitric acid in the presence of silver nitrate. This method is described in German Pat. No. 906,220. More recently, thermal decomposition of poly(p-xylylene peroxide) is claimed to produce 70 percent by weight of p-hydroxymethylbenzaldehyde. This technique is described by W. A. Errede and S. L. Hopwood, Jr., in J. Am. Chem. Soc. 79, 6507–10 (1957) and in British Pat. No. 801,233. All present methods suffer from poor yields or from high costs of reagents so as to make them commercially impractical.

SUMMARY OF THE INVENTION

In theory, it should be possible to treat terephthalaldehyde with hydrogen in the presence of a catalyst and obtain p-hydroxymethylbenzaldehyde by stopping the reaction after addition of one molar equivalent of hydrogen. In practice, however, the reaction is complicated by hydrogenation of the second aldehyde function. Hence addition of one mole of hydrogen results in a mixture of the desired product together with p-xylene glycol and unreduced terephthalaldehyde. Such a product mixture would require rather complicated and expensive separation procedures.

At higher temperatures and pressures the hydrogenation of terephthalaldehyde is further complicated by hydrogenolysis of the hydroxymethyl function to methyl. On the other hand, under milder conditions the rate of hydrogenation is too slow to allow industrial exploitation.

One object of the present invention is to suppress these drawbacks while producing p-hydroxymethylbenzaldehyde rapidly at relatively low temperature and pressure with few hydrogenation or hydrogenolysis by-products. Other objects will be apparent to those skilled in the art from the following description.

We have discovered that terephthalaldehyde in aqueous or alcoholic solution contacted with hydrogen at moderate temperature and pressure in the presence of a catalyst selected from metals of the eighth periodic group poisoned with base is converted with excellent selectivity and good yield to p-hydroxymethylbenzaldehyde when the reaction is continued until the stoichiometric amount of hydrogen necessary for the reduction has reacted. Reaction of less or more than the stoichiometric amount leads to unconverted terephthalaldehyde or a mixture of undesired hydrogenation or hydrogenolysis products respectively and is therefore not advantageous.

The temperature for the reduction is conveniently from 0 to 100° C. and preferably from 25 to 50° C. The pressure is in the range 1 to 10 atmospheres absolute and preferably 1 to 3 atmospheres absolute. Temperatures and pressures below the above ranges provide a rate of hydrogenation too slow for industrial use whereas temperatures and pressures much above the specified ranges decrease the selectivity of the reduction for p-hydroxymethylbenzaldehyde.

The solvent in the present method must be relatively inert and have solvency for terephthalaldehyde. By relative inertness, we mean that the solvent does not react with terephthalaldehyde, with hydrogen or with the catalyst in such a manner as to interfere with the desired reaction. According to the above requirements, the preferred solvents are aliphatic alcohols. Suitable aliphatic alcohols have 1 to 10 carbon atoms and include methyl alcohol, ethyl alcohol, propyl alcohol, isopropyl alcohol, butyl alcohol, isobutyl alcohol, t-butyl alcohol, and sec-butyl alcohol. Other suitable alcohols include tetrahydrofurfuryl alcohol. Usable solvents other than alcohols include water and glycols and glycol ethers of the formula:

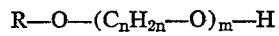

$$R\text{—}O\text{—}(C_nH_{2n}\text{—}O)_m\text{—}H$$

wherein R is H or $C_mH_{2m+1}$, $m$, is an integer between 1 and 5 inclusive and $n$ is an integer between 2 and 8, as, for example, trimethylene glycol, 1,3-butanediol, 1,5-pentanediol, 2,5-hexanediol, and diethylene glycol or its methyl, ethyl or butyl ether. Oxides such as 1,4-dioxane and tetrahydrofuran, esters such as methyl acetate, nitrogeneous compounds such as dimethyl formamide are also useful as inert solvents, as are liquid hydrocarbons such as benzene, toluene, and xylene.

Metals of the eighth periodic group consisting of iron, cobalt, nickel, ruthenium, rodium, palladium, osmium, iridium, and platinum are catalysts in the process of the invention. Of these metals, palladium, platinum and nickel, are particularly useful since they exhibit good catalytic activity and are readily available. It has been our experience that of these three metals, palladium affords the best selectivity for p-hydroxymethylbenzaldehyde vis-a-vis hydrogenation and hydrogenolysis products.

Base to poison the metal catalyst is essential to the process to provide selectivity for p-hydroxymethylbenzaldehyde. The base used has a pK preferably greater than 5.0. Suitable bases include inorganic bases such as the hydroxides of metals in the first and second periodic groups, and organic bases such as the amines. Preferred inorganic bases include sodium hydroxide, potassium hydroxide, magnesium hydroxide and calcium hydroxide. A great variety of amines are suitable. Aliphatic, aromatic and heterocyclic amines may be employed. For example, suitable aliphatic amines are trimethylamine, diethylamine, propylamine and ethylenediamine; suitable aromatic amines are aniline, dimethylaniline, toluidines and phenylene diamines; and heterocyclic amines are collidines, pyridine, quinoline, lutidines, picolines, etc. The preferred amine is pyridine.

Only a small amount of base is used to poison the catalyst. The amount while not narrowly critical should not be so much as to completely deactivate the metal catalyst. We prefer to use an amount between 0.10 meq. and 0.50 meq. per mg. of metal catalyst. However, if more than about 0.15 meq. per mg. of metal catalyst is used, the rate of reduction becomes extremely slow. The operable amount of base is a function of both the strength of the base and the nature of the metal catalyst. The operable range for each base and metal catalyst can be determined by a few routine experiments well within the skill of the art.

DESCRIPTION OF THE PREFERRED EMBODIMENTS

The following preferred embodiments of the invention are shown for the purpose of illustrating the invention and demonstrating the best mode for practicing the invention. It will be apparent to those skilled in the art that various changes and modifications may be made therein without departing from the spirit and scope of the invention as it is more precisely defined in the subjoined claims.

Example 1

In each of four tests a 500 ml. Parr low pressure hydrogenation vessel was charged with 13.4 g. (0.10 mole) of terephthalaldehyde, 0.200 g. of 5 percent palladium on carbon, 60 ml. of water and 140 ml. of ethanol. The amount of sodium hydroxide indicated in Table I was added to the mixture. The vessel was then placed on a Parr shaker under an initial pressure of 45 p.s.i.g. of hydrogen and shaken at 25° C. The amount of hydrogen consumed and the time necessary for the consumption is reported in Table I. The vessel was removed from the shaker and the contents filtered through a bed of Celite to remove the catalyst. The solvent was stripped from the product under reduced pressure leaving a yellow oil which solidified on cooling to room temperature. Results of analysis of the product by vapor phase chromatography is reported below in Table I.

The present example indicates that the selectivity for and yield of $p$-hydroxymethylbenzaldehyde can be improved by the addition of a small amount of base.

Example 2

Using the procedure of Example 1 the following two tests were made: aqueous tetrahydrofuran (70 percent by weight tetrahydrofuran in water) was substituted for the combination of water and ethyl alcohol in Test 5.

TABLE II

| Test Number | Solvent system | Base inhibitor | Reaction time and mole uptake $H_2$ | Product analysis, percent | | | |
|---|---|---|---|---|---|---|---|
| | | | | $p$-HMB [2] | TPA [3] | BDM [4] | Other [5] |
| 5 | 30% $H_2O$, 70% tetrahydrofuran | 1.23 meq., NaOH | 28 min., 1.0 mole | 83.21 | 7.25 | 9.54 | |

See Table I for footnotes 2, 3, 4 and 5.

The purpose of Example 2 is to demonstrate the operability of other solvent systems in our process.

Other metal catalysts of the eighth periodic group such as platinum and nickel, for example, provide results comparable to those above. The metal catalyst may be supported on inert materials other than carbon such as alumina, magnesia, silica gel or pumice.

From the foregoing description it is considerably clear that the present invention contributes a substantial benefit to the art by providing a process for the preparation of $p$-hydroxymethylbenzaldehyde, selectively and in good yield, from terephthalaldehyde. It is also demonstrated by way of example that the product is substantially free of $p$-xylene glycol, $p$-methylbenzaldehyde, and $p$-xylene.

We claim:

1. A catalytic hydrogenation process for obtaining $p$-hydroxymethylbenzaldehyde, substantially free of $p$-xylene glycol, $p$-methylbenzaldehyde and $p$-xylene, by reducing terephthalaldehyde, the process comprising concurrently contacting hydrogen and terephthalaldehyde in an inert solvent in the presence of a catalyst, which is a metal of the eighth periodic group, and a base selected from the group consisting of inorganic bases having a pK greater than 5.0 and amines; wherein the contacting is at a temperature from 0 to 100° C. and a hydrogen pressure from 1 to 10 atmospheres; and discontinuing said contacting when a stoichiometric amount of hydrogen necessary for the reaction has reacted wherein the said base is present in an amount from 0.10 meq. to 0.50 meq. per mg. of palladium.

2. The process of Claim 1 wherein the contacting is at a temperature from 25 to 50° C. and a hydrogen pressure from 1 to 3 atmospheres.

3. The process of Claim 1 wherein the contacting is at a temperature from 25 to 50° C., a hydrogen pressure from 1 to 3 atmospheres and the metal catalyst is palladium.

4. The process of Claim 1 wherein the metal catalyst is palladium.

TABLE I

| Test number | Solvent system | Base inhibitor | Reaction time and mole uptake $H_2$ | Product analysis, percent | | | |
|---|---|---|---|---|---|---|---|
| | | | | $p$-HMB [2] | TPA [3] | BDM [4] | Other [5] |
| 1 | 30% $H_2O$, 70% EtOH [1] | None | 23 min., 1.0 mole | 76.41 | 12.10 | 8.14 | 3.25 |
| 2 | 30% $H_2O$, 70% EtOH | 1.12 meq. NaOH | 1 hr. 46 min., 0.88 mole | 71.49 | 20.87 | 6.84 | 0.90 |
| 3 | 30% $H_2O$, 70% EtOH | 1.40 meq. NaOH | 1 hr. 12 min., 0.88 mole | 79.38 | 14.77 | 5.85 | |
| 4 | 30% $H_2O$, 70% EtOH | 1.68 meq. NaOH | 4 hrs. 47 min., 0.94 mole | 92.05 | 1.10 | 6.85 | |

[1] EtOH = Ethyl alcohol.
[2] $p$-HMB = $p$-Hydroxymethylbenzaldehyde.
[3] TPA = Terephthalaldehyde.
[4] BDM = 1,4-benzene dimethanol ($p$-xylene glycol).
[5] Other may be a mixture of $p$-methylbenzaldehyde, $p$-methylbenzyl alcohol or $p$-xylene.

5. The process of Claim 1 wherein the metal catalyst is platinum.

6. The process of Claim 1 wherein the metal catalyst is platinum oxide.

7. The process of Claim 1 wherein the metal catalyst is nickel.

8. The process of Claim 1 wherein the metal catalyst is Raney nickel.

9. The process of Claim 1 wherein the solvent is an aliphatic alcohol having 1 to 10 carbon atoms.

References Cited

UNITED STATES PATENTS

| | | | |
|---|---|---|---|
| 2,983,734 | 5/1961 | Sargent | 260—618 H X |
| 3,663,626 | 5/1972 | Arrigo et al. | 260—618 H X |

BERNARD HELFIN, Primary Examiner

U.S. Cl. X.R.

260—618 H